United States Patent
Rich et al.

(10) Patent No.: US 11,843,088 B2
(45) Date of Patent: Dec. 12, 2023

(54) GRAPHITE FOIL AS AN ACTIVE HEATING AND PASSIVE COOLING MATERIAL IN A BATTERY PACK

(71) Applicant: GM GLOBAL TECHNOLOGY OPERATIONS LLC, Detroit, MI (US)

(72) Inventors: Dave G. Rich, Sterling Heights, MI (US); Saad Hasan, Detroit, MI (US); Lyall K Winger, Waterloo (CA); Dewen Kong, Shanghai (CN); Haijing Liu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 151 days.

(21) Appl. No.: 17/394,224

(22) Filed: Aug. 4, 2021

(65) Prior Publication Data
US 2022/0045379 A1 Feb. 10, 2022

(30) Foreign Application Priority Data
Aug. 7, 2020 (CN) .......................... 202010790067.5

(51) Int. Cl.
*H01M 10/615* (2014.01)
*C09K 5/14* (2006.01)
(Continued)

(52) U.S. Cl.
CPC ............ *H01M 10/615* (2015.04); *C09K 5/14* (2013.01); *H01M 10/0525* (2013.01); *H01M 10/613* (2015.04)

(58) Field of Classification Search
None
See application file for complete search history.

(56) References Cited

U.S. PATENT DOCUMENTS

| 2,927,879 A | 3/1960 | Jones |
| 6,909,201 B2 | 6/2005 | Murty et al. |
| (Continued) | | |

FOREIGN PATENT DOCUMENTS

| CN | 106571484 A | * 4/2017 | ........ H01M 10/4235 |
| CN | 114069053 A | 2/2022 | |
| (Continued) | | | |

OTHER PUBLICATIONS

English language machine translation of WO-2017159528-A1. (Year: 2023).*

(Continued)

*Primary Examiner* — Eli S Mekhlin
(74) *Attorney, Agent, or Firm* — Harness, Dickey & Pierce, P.L.C.

(57) ABSTRACT

The present disclosure relates a temperature regulating system including an anisotropic material for use as a heating material or element (e.g., an active heater) and a cooling material or element (e.g., passive cooling) in a battery pack including one or more electrochemical cells. The temperature regulating system includes one or more temperature control elements. Each temperature control element is configured to be in a heat transfer relationship with one or more electrochemical cells so as to heat and/or cool the one or more electrochemical cells of the battery pack. Each temperature control element includes two or more structural elements and one or more anisotropic elements disposed between the two or more structural elements. The temperature control elements may be disposed between the electrochemical cells of the stack, disposed around the electrochemical cells of the stack, or both.

18 Claims, 10 Drawing Sheets

(51) Int. Cl.
*H01M 10/0525* (2010.01)
*H01M 10/613* (2014.01)

(56) References Cited

U.S. PATENT DOCUMENTS

| | | |
|---|---|---|
| 9,184,582 B2 | 11/2015 | Koch et al. |
| 9,440,600 B2 | 9/2016 | Koch et al. |
| 9,911,249 B2 | 3/2018 | Koch et al. |
| 10,395,442 B2 | 8/2019 | Conell et al. |
| 10,777,998 B2 | 9/2020 | Conell et al. |
| 10,826,139 B2 | 11/2020 | Rich et al. |
| 2015/0014890 A1 | 1/2015 | Xiao |
| 2019/0013556 A1 | 1/2019 | Sakaguchi et al. |
| 2019/0359063 A9 | 11/2019 | Jiang et al. |
| 2020/0018796 A1 | 1/2020 | Conell et al. |
| 2020/0150182 A1 | 5/2020 | Rich et al. |
| 2020/0152938 A1 | 5/2020 | Winger et al. |
| 2020/0153028 A1 | 5/2020 | Winger et al. |
| 2020/0153050 A1 | 5/2020 | Winger et al. |
| 2020/0153051 A1 | 5/2020 | Winger et al. |

FOREIGN PATENT DOCUMENTS

| | | | |
|---|---|---|---|
| DE | 102021110479 A1 | 2/2022 | |
| WO | WO-2014208930 A1 * | 12/2014 | ............... B05D 3/12 |
| WO | WO-2017159528 A1 * | 9/2017 | ............. B32B 15/09 |
| WO | WO-2017208930 A1 | 12/2017 | |
| WO | 2018174864 A1 | 9/2018 | |

OTHER PUBLICATIONS

English language machine translation of CN-106571484-A. (Year: 2023).*

First Office Action for German Patent Application No. 102021110479.3 dated Oct. 23, 2023, with correspondence from Manitz Finsterwald Patent—und Rechtsanwaltspartnerschaft mbB summarizing Office Action; 6 pages.

* cited by examiner

GRAPHITE FOIL AS AN ACTIVE HEATING AND PASSIVE COOLING MATERIAL IN A BATTERY PACK

CROSS-REFERENCE TO RELATED APPLICATIONS

This application claims the benefit and priority of Chinese Application No. 202010790067.5, filed Aug. 7, 2020. The entire disclosure of the above application is incorporated herein by reference.

INTRODUCTION

This section provides background information related to the present disclosure which is not necessarily prior art.

The present disclosure relates to the use of an anisotropic material or element, such as graphite, for example in the form of a foil, as a heating material or element (e.g., an active heater) and a cooling material or element (e.g., passive cooling), for example within a battery pack including one or more electrochemical cells, so as to create controllable temperature regions within the battery and/or pack (e.g., isotherms and other desired thermal patterns and/or gradients) that may prevent and/or minimize, for example, lithium plating, uneven wear and, drying and over-heating, and improve wide-range temperature performance.

Electrochemical energy storage devices, such as lithium-ion batteries, can be used in a variety of products, including automotive products, such as start-stop systems (e.g., 12V start-stop systems), battery-assisted systems ("μBAS"), Hybrid Electric Vehicles ("HEVs"), and Electric Vehicles ("EVs"). Typical lithium-ion batteries include two electrodes, a separator, and an electrolyte. However, in solid-state or semi-solid state batteries, the separator and solid-state electrolyte may be a single component. Lithium-ion batteries may also include various terminal (e.g., tab) and packaging materials (e.g., pouch). In electrochemical cells, such as in lithium-ion batteries, one of the two electrodes serves as a positive electrode or cathode, and the other electrode serves as a negative electrode or anode.

Rechargeable lithium-ion batteries operate by reversibly passing lithium ions back and forth between the negative electrode and the positive electrode. For example, lithium ions may move from the positive electrode to the negative electrode during charging of the battery and in the opposite direction when discharging the battery. A separator and/or electrolyte may be disposed between the negative and positive electrodes. The electrolyte is suitable for conducting lithium ions (or sodium ions in the case of sodium-ion batteries) between the electrodes and, like the two electrodes, may be in a solid form, a liquid form, or a solid-liquid hybrid form. In solid-state batteries, which include a solid-state electrolyte disposed between solid-state electrodes, the solid-state electrolyte physically separates the electrodes so that a distinct separator is not required.

When operating at elevated temperatures, electrochemical cells, including batteries, can be subject to capacity loss, power fade, and in certain circumstances, thermal runaway. On the other hand, operating at temperatures that are too low may result in increased resistance, increased plating, and decreased capacity. Maintaining desired operating temperature ranges maximizes the efficiency and life span of the cells. However, in certain instances, for example as a result of current flow paths, common algorithmic heating solutions tend to preferentially warm areas around and between battery terminals more quickly than the bottom and or sides of the battery. Such non-uniform thermal distribution may potentially cause the cell bottom and sides to be more susceptible to lithium-plating as the cell warms, as well as to create weak/strong characteristics at different places within the battery. Further still, in instances of lithium-ion battery packs, where batteries or cells are electrically connected (e.g., in parallel or in series), for example in a stack, so as to increase overall output, cells located at internal positions within the pack may experience instances of higher thermal resistance than that of cells located at external positions. Such temperature differentials within a pack may result in different cell performance degradation. Accordingly, mechanisms and materials (e.g., temperature regulation systems) for electrochemical cells or batteries, and battery packs including one or more electrically connected batteries or cells, are desirable.

SUMMARY

This section provides a general summary of the disclosure, and is not a comprehensive disclosure of its full scope or all of its features.

In various aspects, a temperature control element for an electrochemical cell is provided. The temperature control element may include two or more structural elements and one or more anisotropic elements disposed between the two or more structural elements. The one or more anisotropic elements may each include one or more anisotropic materials selected from the group consisting of: graphite, graphene, carbon nanotubes (CNT), crystal materials, cohesive powder, and combinations thereof. The temperature control element may be configured to be in a heat transfer relationship with the electrochemical cell so as to heat and/or cool the electrochemical cell.

In one aspect, the temperature control element may further include one or more tabs in electrical communication with the one or more anisotropic elements. The one or more tabs may each include one or more of copper, aluminum, nickel, nickel coated copper, stainless steel, and aluminum alloys.

In one aspect, the one or more tabs may define one or more tab layers. For example, a first tab layer may be disposed between the one or more anisotropic elements and a first structural element of the two or more structural elements, and a second tab layer may be disposed between the one or more anisotropic elements and a second structural element of the two or more structural elements. Each tab layer of the one or more tab layers may include a first part that is disposed at a first terminal end and a second part that is disposed at a second terminal end separated from the first terminal end such that a gap may be defined in a central region between the first part and the second part of each tab layer of the one or more tab layers.

In one aspect, the one or more anisotropic elements and the one or more tabs may define a heating element.

In one aspect, the two or more structural elements may each include one or more of mica, asbestos, marble, porcelain, glass, shellac, resin, rubber, cotton yarn, paper, linen, rayon, and plastic.

In one aspect, at least one of the two or more structural elements may further include one or more adhesive materials that may be selected from the group consisting of: polyethylene terephthalate (PET), polypropylene (PP), polyethylene (PE), polytetrafluoroethylene (PTFE), and combinations thereof.

In one aspect, the two or more structural elements may be first structural elements and the temperature control element may further include one or more second structural elements disposed between adjacent anisotropic elements.

In one aspect, the one or more anisotropic elements may define one or more foils. Each foil may have a thickness greater than or equal to about 1 μm to less than or equal to about 10,000 μm.

In one aspect, the temperature control element may further include one or more insulating materials, the one or more foils may each have a plurality of folds, and the one or more insulating materials may be disposed between folds of the one or more foils defining the one or more anisotropic elements.

In one aspect, the one or more anisotropic elements includes a first grouping of anisotropic elements including one or more first anisotropic materials and a second grouping of anisotropic elements including one or more second anisotropic materials. Each of the first and second groupings of anisotropic elements may be independently controlled.

In one aspect, the two or more structural elements are one or more first structural elements and the temperature control element further includes one or more second structural elements disposed between the first grouping of anisotropic elements and the second grouping of anisotropic elements.

In various aspects, the present disclosure provides an example battery pack having a temperature regulating system including one or more temperature control elements. The battery pack includes a plurality of electrochemical cells arranged in a stack and defining the battery pack. Each temperature control element of the one or more temperature control elements includes two or more structural elements and one or more anisotropic elements disposed between the two or more structural elements. The one or more anisotropic elements may each include one or more anisotropic materials selected from the group consisting of: graphite, graphene, carbon nanotubes (CNT), crystal materials, cohesive powder, and combinations thereof. The temperature control elements may be at least one of: (i) disposed between the electrochemical cells of the stack; (ii) disposed around the electrochemical cells of the stack; or (iii) both (i) and (ii).

In one aspect, each of the temperature control elements may further include one or more tabs in electrical communication with the one or more anisotropic elements. The one or more tabs may each include one or more of copper, aluminum, nickel, nickel coated copper, stainless steel, and aluminum alloys.

In one aspect, the one or more anisotropic elements and the one or more tabs of each temperature control element may define a heating element.

In one aspect, the two or more structural elements of each temperature control element may include one or more of mica, asbestos, marble, porcelain, glass, shellac, resin, rubber, cotton yarn, paper, linen, rayon, and plastic; and the one or more adhesive materials may be selected from the group consisting of: polyethylene terephthalate (PET), polypropylene (PP), polyethylene (PE), polytetrafluoroethylene (PTFE), and combinations thereof.

In one aspect, the one or more anisotropic elements of each temperature control element may include a first grouping of anisotropic elements that includes one or more first anisotropic elements and a second grouping of anisotropic elements that includes one or more second anisotropic elements. Each of the first and second groupings of anisotropic elements may be independently controlled.

In one aspect, each temperature control element of the one or more temperature control elements may be independently controlled.

In one aspect, the one or more temperature control elements may define one or more foils. The one or more foils may each have a plurality of folds. Individual electrochemical cells of the stack may be disposed between folds of the one or more foils so as to define the one or more temperature control elements.

In one aspect, the one or more temperature control elements may define distinct layers and individual electrochemical cells of the stack may be disposed between the distinct layers.

In various aspects, a temperature control element for an electrochemical cell is provided. The temperature control element includes two or more structural elements coated and one or more anisotropic elements disposed between the two or more structural elements. Each structural element may be coated with one or more adhesive layers. The one or more anisotropic elements may include a first grouping of anisotropic elements including one or more first anisotropic materials and a second grouping of anisotropic elements including one or more second anisotropic materials. The one or more first anisotropic materials and the one or more second anisotropic materials may each be selected from the group consisting of: graphite, graphene, carbon nanotubes (CNT), crystal materials, cohesive powder, and combinations thereof. Each of the first and second groupings of anisotropic elements may be independently controlled. The temperature control element may be configured to be in a heat transfer relationship with the electrochemical cell so as to heat and/or cool the electrochemical cell.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
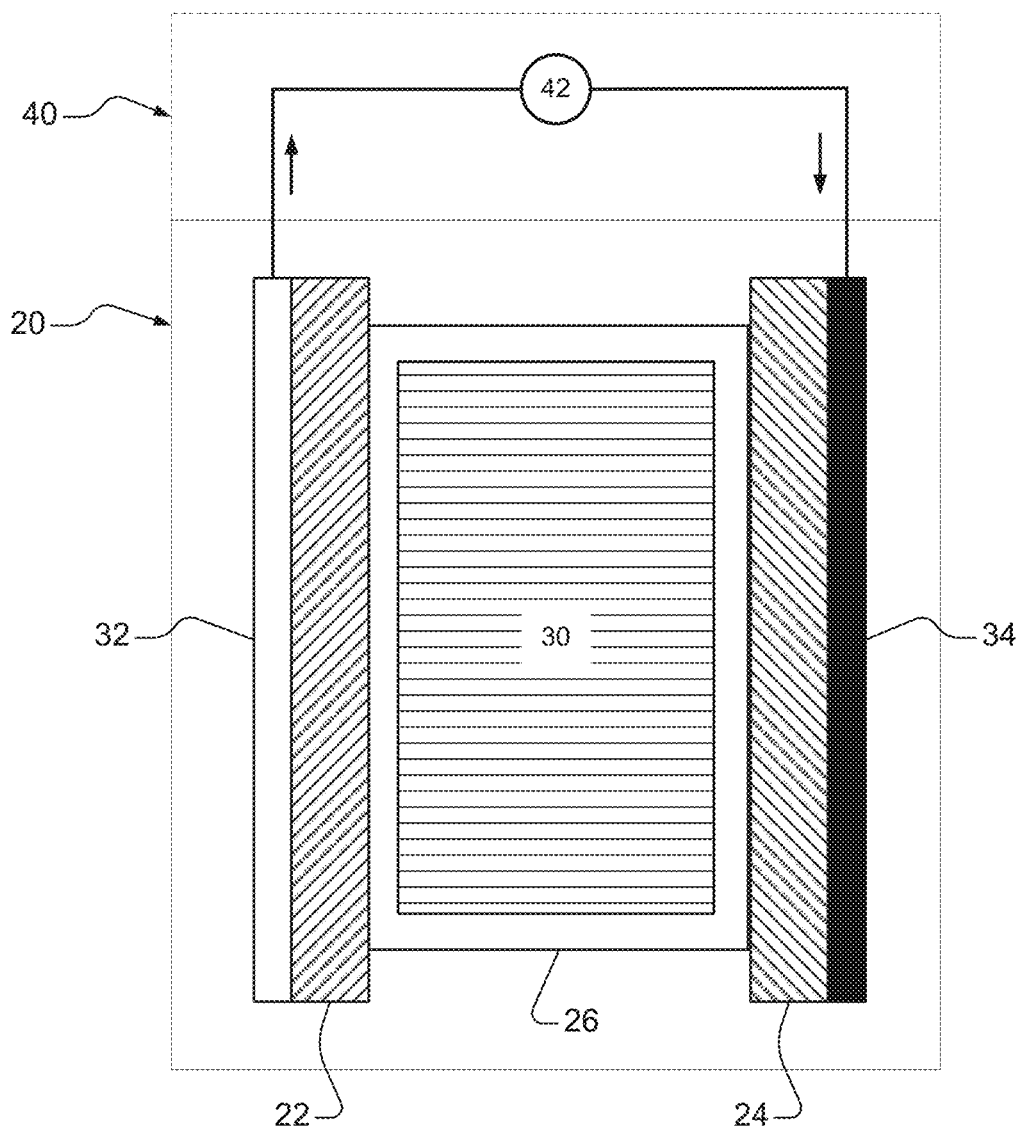
FIG. 1 is a schematic of an example of an electrochemical battery cell for cycling lithium ions.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Electrochemical cells or batteries employable, for example, in vehicles, such as automobiles, motorcycles, boats, tractors, buses, mobile homes, campers, all-terrain vehicles, snowmobiles, airplanes, and tanks, may be exposed to wide operating temperatures, for example temperatures in a range of greater than or equal to about −20° C. to less than or equal to about 60° C. Accordingly, the current technology provides systems and methods for regulating the operating temperature of electrochemical cells or batteries, and battery packs including one or more electrically connected (e.g., in series or parallel) electrochemical cells or batteries. More particularly, the current technology, as further detailed below, relates to the use of an anisotropic material or element, such as graphite, for example in the form of a foil, as a heating material or element (e.g., an active heater) and a cooling material or element (e.g., passive cooling), so as to create controllable temperature regions within the battery and/or pack (e.g., isotherms and other desired thermal patterns and/or gradients) that may prevent, for example, lithium plating, and improve temperature performance over a wide range of temperatures.

By way of non-limiting background, an exemplary schematic illustration of an electrochemical cell or battery 20 (also referred to as the battery, which comprises at least one electrochemical cell) that cycles ions is shown in FIG. 1. Unless specifically indicated otherwise, the term "ions" as used herein refers to lithium ions or sodium ions. For example, an electrochemical cell that cycles sodium ions has similar components as the battery 20 that cycles lithium ions, but replaces the lithium and lithium ions with sodium and sodium ions in corresponding components.

The battery 20 includes a negative electrode (i.e., an anode) 22, a positive electrode (i.e., a cathode) 24, and a separator 26 (e.g., a microporous polymeric separator) disposed between the two electrodes 22, 24. An electrolyte 30 is present throughout the separator 26 and, optionally, in the negative electrode 22 and positive electrode 24. A negative electrode current collector 32 may be positioned at or near the negative electrode 22 and a positive electrode current collector 34 may be positioned at or near the positive electrode 24. While not shown, the negative electrode current collector 32 and the positive electrode current collector 34 may be coated on one or both sides, as is known in the art. In certain aspects, the current collectors 32, 34 may be coated with an electrode active material/electrode layer on both sides. The negative electrode current collector 32 and positive electrode current collector 34 respectively collect and move free electrons to and from an external circuit 40 (as shown by the block arrows). For example, an interruptible external circuit 40 and a load device 42 may connect the negative electrode 22 (through the negative electrode current collector 32) and the positive electrode 24 (through the positive electrode current collector 34). In this manner, current collectors 32, 34 may define tabs (not shown) that are in electrical communication with battery terminals (not shown).

The battery 20 can generate an electric current during discharge by way of reversible electrochemical reactions that occur when the external circuit 40 is closed (to connect the negative electrode 22 and the positive electrode 24) and the negative electrode 22 contains a relatively greater quantity of lithium than the positive electrode 24. The chemical potential difference between the positive electrode 24 and the negative electrode 22 drives electrons produced by a reaction, for example, the oxidation of intercalated lithium, at the negative electrode 22 through the external circuit 40 towards the positive electrode 24. Lithium ions that are also produced at the negative electrode 22 are concurrently transferred through the electrolyte 30 contained in the separator 26 towards the positive electrode 24. The electrons flow through the external circuit 40 and the lithium ions migrate across the separator 26 containing the electrolyte solution 30 to form intercalated lithium at the positive electrode 24. As noted above, electrolyte 30 is typically also present in the negative electrode 22 and positive electrode 24. The electric current passing through the external circuit 40 can be harnessed and directed through the load device 42 until the lithium in the negative electrode 22 is depleted and the capacity of the battery 20 is diminished.

While the load device 42 may be any number of known electrically powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be a power-generating apparatus that charges the lithium-ion battery 20 for purposes of storing energy. In certain other variations, the electrochemical cell may be a supercapacitor, such as a lithium-ion based supercapacitor.

The battery 20 can be charged or re-energized at any time by connecting an external power source to the lithium ion battery 20 to reverse the electrochemical reactions that occur during battery discharge. Connecting an external electrical energy source to the battery 20 promotes a reaction, for example, non-spontaneous oxidation of intercalated lithium, at the positive electrode 24 so that electrons and lithium ions are produced. The lithium ions flow back towards the negative electrode 22 through the electrolyte 30 across the separator 26 to replenish the negative electrode 22 with lithium (e.g., intercalated lithium) for use during the next battery discharge event. As such, a complete discharging event followed by a complete charging event is considered a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator. Accordingly, the lithium-ion battery 20 can generate electric current for the load device 42 that can be operatively connected to the external circuit 40.

In many lithium ion battery configurations, each of the negative electrode current collector 32, negative electrode 22, the separator 26, positive electrode 24, and positive electrode current collector 34 are prepared as relatively thin layers (for example, from several microns to a fraction of a millimeter or less in thickness) that define a respective cell, which are then assembled in layers connected in electrical parallel arrangement to provide a suitable electrical energy and power package. Further, the separator 26 operates as an electrical insulator by being sandwiched between the negative electrode 22 and the positive electrode 24 to prevent physical contact and thus, the occurrence of a short circuit. Where the electrolyte 30 is a liquid or semi-solid, the separator 26, in addition to providing a physical barrier between the two electrodes 22, 24, is porous and thus acts like a sponge that contains the electrolyte 30 in a network of open pores during the cycling of lithium ions, to facilitate functioning of the battery 20.

The battery 20 can include a variety of other components that while not depicted here are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications.

Figure 2:
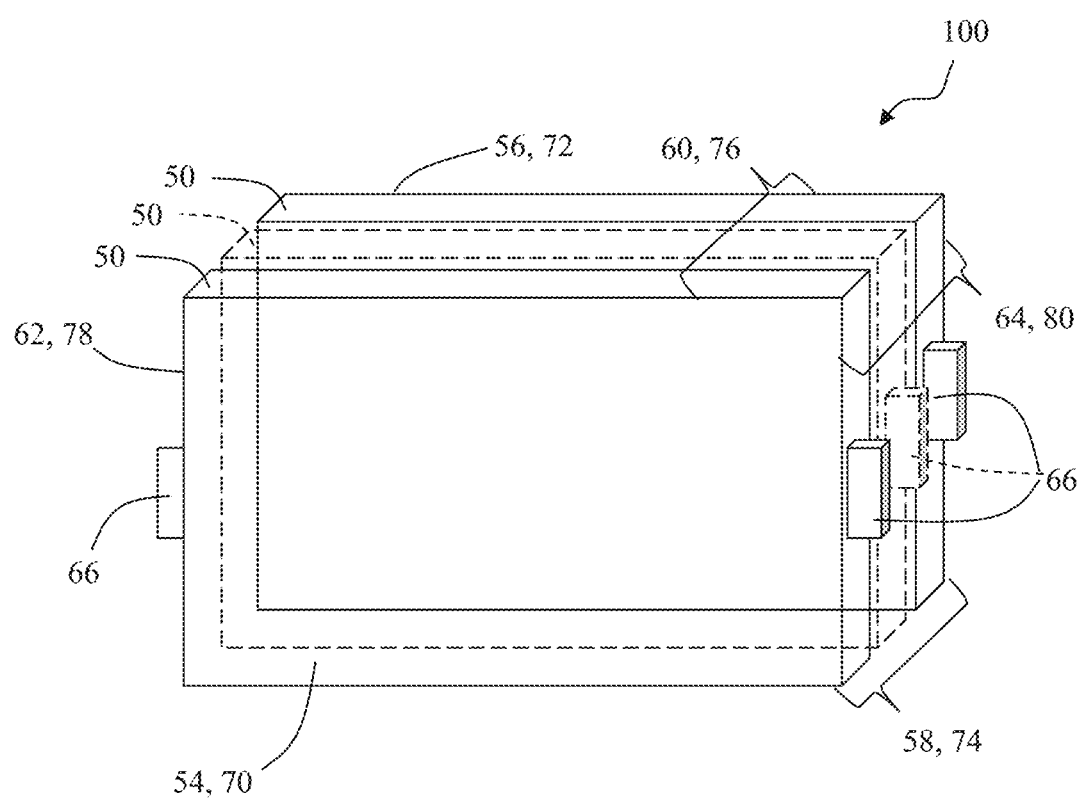
FIG. 2 is a schematic illustration of an example battery pack including a plurality of battery modules.

In various aspects, the battery 20 may also be connected, for example in a stack, with series or parallel electrical connections, with other similar lithium ion cells or batteries to produce a greater voltage output, energy, and power if it is required by the load device 42. For example, a plurality of cells or batteries 20 may be stacked to define a battery module 50 and a plurality of battery modules 50 may be operatively-connected in series or parallel to define a battery pack 100, as illustrated in FIG. 2. As the skilled artisan will appreciate, each battery module 50 may include one or more cells or batteries 20 (as illustrated in FIG. 1), and the battery pack 100 may include two or more battery modules 50. For example, as illustrated in FIG. 2, the battery pack 100 may include two or more battery modules 50. In FIG. 2, the central battery module 50 is shown with dashed lines and is meant to illustrate that the central battery module 50 is optional or can be any number of other battery modules 50, such as, for example only, greater than or equal to 1 to less than or equal to less than or equal to about 50 battery modules 50.

The battery pack 100 comprises a first side surface 70 defined by a first cell wall 54 of a first terminal battery module 50 of the plurality, an opposing second side surface 72 defined by a second cell wall 56 of a last terminal battery module 50 of the plurality, and opposing first and second stack edges 74, 76 defined by the first and second cell edges 58, 60 of each battery module 50 of the plurality. The first and second stack edges 74, 76 are orthogonal to the first and second side surfaces 70, 72. The battery pack 100 also comprises opposing first and second stack ends 78, 80 defined by the first and second cell ends 62, 64 of each battery module 50 of the plurality. Each battery module 50 may include tabs 66 extending generally outwardly from at least one of the first and second cell ends 62, 64 of each battery module 50 of the plurality. In certain aspects, each battery module 50 includes two tabs 66, one being associated with at least one anode 22 and the other tab 66 being associated with at least one cathode 24. The two tabs 66 can be located on opposing cell ends 62, 64 of each battery module 50 of the plurality. In other instances, the two tabs can both be located on a single end, the single end being either the first cell end 62 or the second cell end 64 of the respective battery module 50. Although the tabs 66 of each battery 20 are shown exposed in FIG. 2, it is understood that they can be connected, such as with a bus bar as a non-limiting example.

With renewed reference to FIG. 1, the positive electrode 24, the negative electrode 22, and the separator 26 may each include an electrolyte solution or system 30 inside their pores, capable of conducting lithium ions between the negative electrode 22 and the positive electrode 24. Any appropriate electrolyte 30, whether in solid, liquid, or gel form, capable of conducting lithium ions between the negative electrode 22 and the positive electrode 24 may be used in the lithium-ion battery 20. In certain aspects, the electrolyte 30 may be a non-aqueous liquid electrolyte solution that includes a lithium salt dissolved in an organic solvent or a mixture of organic solvents. Numerous conventional non-aqueous liquid electrolyte 30 solutions may be employed in the lithium-ion battery 20.

A non-limiting list of lithium salts that may be dissolved in an organic solvent to form the nonaqueous liquid electrolyte solution includes lithium hexafluorophosphate ($LiPF_6$), lithium fluorosulfonylimide ($LiN(FSO_2)_2$) (LiFSI), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium hexafluoroarsenate ($LiAsF_6$), lithium trifluoromethanesulfonate ($LiCF_3SO_3$), lithium bis(trifluoromethanesulfonimide) (LiTFSI) ($LiN(CF_3SO_2)_2$), and combinations thereof.

These and other similar lithium salts may be dissolved in a variety of organic solvents, including, but not limited to, various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethyl methyl carbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane (DME), 1-2-diethoxyethane, ethoxymethoxyethane), cyclic ethers (e.g., tetrahydrofuran, 2-methyltetrahydrofuran, 1,3-dioxolane (DOL)), sulfur compounds (e.g., sulfolane), and combinations thereof. In various aspects, the electrolyte may include greater than or equal to about 0.5 M to less than or equal to about 4.0 M of the one or more lithium salts.

The separator 26 operates as both an electrical insulator and a mechanical support. In one embodiment, a microporous polymeric separator 26 comprises a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP.

When the separator 26 is a microporous polymeric separator, it may be a single layer or a multi-layer laminate, which may be fabricated from either a dry or wet process. For example, in one embodiment, a single layer of the polyolefin may form the entire microporous polymer separator 26. In other aspects, the separator 26 may be a fibrous membrane having an abundance of pores extending between the opposing surfaces and may have a thickness of less than a millimeter, for example. As another example, multiple discrete layers of similar or dissimilar polyolefins may be assembled to form the microporous polymer separator 26. The polyolefins may be homopolymers (derived from a single monomer constituent) or heteropolymers (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), a blend of PE and PP, or multi-layered structured porous films of PE and/or PP. The microporous polymer separator 26 may also comprise other polymers in addition to the polyolefin, such as, but not limited to, polyethylene terephthalate (PET), polyvinylidene fluoride (PVDF), and/or a polyamide. Furthermore, the porous separator 26 may be mixed with a ceramic material or its surface may be coated in a ceramic material. For example, a ceramic coating may include alumina ($Al_2O_3$), silicon dioxide ($SiO_2$), titania ($TiO_2$), or combinations thereof.

Commercially available polyolefin porous membranes include CELGARD® 2500 (a monolayer polypropylene separator) and CELGARD® 2320 (a trilayer polypropylene/polyethylene/polypropylene separator), both available from Celgard, LLC. The polyolefin layer and any other optional polymer layers may further be included in the microporous polymer separator 26 as a fibrous layer to help provide the microporous polymer separator 26 with appropriate structural and porosity characteristics. Various conventionally available polymers and commercial products for forming the separator 26 are contemplated, as well as the many manufacturing methods that may be employed to produce such microporous polymer separators 26.

In alternative aspects, the porous separator 26 and the electrolyte 30 may be replaced with a solid-state electrolyte (SSE) (not shown) that functions as both an electrolyte and a separator, as are known in the art. The SSE may be disposed between the positive electrode 24 and negative electrode 22. The SSE facilitates transfer of lithium ions, while mechanically separating and providing electrical insulation between the negative and positive electrodes 22, 24. By way of non-limiting example, SSEs may include $LiTi_2(PO_4)_3$, $LiGe_2(PO_4)_3$, $Li_7La_3Zr_2O_{12}$, $Li_{3x}La_{2/3-x}TiO_3$, $Li_3PO_4$, $Li_3N$, $Li_4GeS_4$, $Li_{10}GeP_2S_{12}$, $Li_2S$—$P_2S_5$, $Li_6PS_5Cl$, $Li_6PS_5Br$, $Li_6PS_5I$, $Li_3OCl$, $Li_{2.99}Ba_{0.005}ClO$, $Li_5La_3M_2O_{12}$, where M is niobium (Nb) or tantalum (Ta), $Li_2O$—$La_2O_3$-$M_2O_5$, where M is niobium (Nb) or tantalum (Ta), $LiAlTi(PO_4)_2$, or LISICON materials like $Li_{2+2x}Zn_{1-x}GeO_4$ or $Li_{(3+x)}Ge_xV_{(1-x)}O_4$, where x may be 0 and 1, and any combinations thereof by way of example. In certain variations, the SSE may be selected from the group consisting of: $Li_5La_3M_2O_{12}$, where M is niobium (Nb) or tantalum (Ta), $Li_2O$—$La_2O_3$-$M_2O_5$, where M is niobium (Nb) or tantalum (Ta), $LiAlTi(PO_4)_2$, or LISICON materials like $Li_{2+2x}Zn_{1-x}GeO_4$ or $Li_{(3+x)}Ge_xV_{(1-x)}O_4$, where x may be 0 and 1, and combinations thereof.

The negative electrode 22 may be formed from a lithium host material that is capable of functioning as a negative terminal of a lithium-ion battery. The negative electrode 22 may thus include the electrode active material and, optionally, another electrically conductive material, as well as one or more polymeric binder materials to structurally hold the lithium host electroactive material particles together.

In certain variations, the negative electrode active material may comprise lithium, such as, for example, lithium metal. In certain variations, the negative electrode 22 is a film or layer formed of lithium metal or an alloy of lithium. Other materials can also be used to form the negative electrode 22, including, for example, lithium-silicon and silicon containing binary and ternary alloys and/or tin-containing alloys, such as Si—Sn, SiSnFe, SiSnAl, SiFeCo, $SnO_2$, and the like. In certain alternative embodiments, lithium-titanium anode materials are contemplated, such as $Li_{4+x}Ti_5O_{12}$, where $0 \leq x \leq 3$, including lithium titanate ($Li_4Ti_5O_{12}$) (LTO). Thus, negative electroactive materials for the negative electrode 22 may be selected from the group consisting of: lithium, graphite, silicon, silicon-containing alloys, tin-containing alloys, and combinations thereof.

Such negative electrode active materials may be optionally intermingled with an electrically conductive material that provides an electron conduction path and/or at least one polymeric binder material that improves the structural integrity of the negative electrode 22. By way of non-limiting example, the negative electrode 22 may include an active material including electroactive material particles (e.g., graphite particles) intermingled with a polymeric binder material selected from the group consisting of polyvinylidene fluoride (PVDF), polytetrafluoroethylene (PTFE), ethylene propylene diene monomer (EPDM) rubber, carboxymethoxyl cellulose (CMC), nitrile butadiene rubber (NBR), lithium polyacrylate (LiPAA), sodium polyacrylate (NaPAA), sodium alginate, lithium alginate, and combinations thereof, by way of example. Additional suitable electrically conductive materials may include carbon-based materials or a conductive polymer. Carbon-based materials may include, by way of non-limiting example, particles of KETCHEN™ black, DENKA™ black, acetylene black, carbon black, and the like. Conductive metal particles may include nickel, gold, silver, copper, aluminum, and the like. Examples of a conductive polymer include polyaniline, polythiophene, polyacetylene, polypyrrole, and the like. In certain aspects, mixtures of conductive materials may be used.

A negative electrode may comprise the negative electrode active material present at greater than about 60 wt. % of the overall weight of the electrode, optionally greater than or equal to about 65 wt. %, optionally greater than or equal to about 70 wt. %, optionally greater than or equal to about 75 wt. %, optionally greater than or equal to about 80 wt. %, optionally greater than or equal to about 85 wt. %, optionally greater than or equal to about 90 wt. %, and in certain variations, optionally greater than or equal to about 95% of the overall weight of the electrode.

The binder may be present in the negative electrode 22 at greater than or equal to about 1 wt. % to less than or equal to about 20 wt. %, optionally greater than or equal to about 1 wt. % to less than or equal to about 10 wt. %, optionally greater than or equal to about 1 wt. % to less than or equal to about 8 wt. %, optionally greater than or equal to about 1 wt. % to less than or equal to about 7 wt. %, optionally greater than or equal to about 1 wt. % to less than or equal to about 6 wt. %, optionally greater than or equal to about 1 wt. % to less than or equal to about 5 wt. %, or optionally greater than or equal to about 1 wt. % to less than or equal to about 3 wt. % of the total weight of the electrode.

In certain variations, the negative electrode 22 includes the electrically-conductive material at less than or equal to about 20 wt. %, optionally less than or equal to about 15 wt. %, optionally less than or equal to about 10 wt. %, optionally less than or equal to about 5 wt. %, optionally less than or equal to about 1 wt. %, or optionally greater than or equal to about 0.5 wt. % to less than or equal to about 8 wt. % of the total weight of the negative electrode. While the electrically conductive materials may be described as powders, these materials can lose their powder-like character following incorporation into the electrode, where the associated particles of the supplemental electrically conductive materials become a component of the resulting electrode structure.

The negative electrode current collector 32 may be formed from copper (Cu) or any other appropriate electrically conductive material known to those of skill in the art.

The positive electrode 24 may be formed from a lithium-based active material that comprises a transition metal and that can sufficiently undergo lithium intercalation and deintercalation, or alloying and dealloying, while functioning as the positive terminal of the battery 20.

In various aspects, the positive electrode 24 may be one of a layered-oxide cathode, a spinel cathode, and a polyanion cathode. For example, layered-oxide cathodes (e.g., rock salt layered oxides) comprise one or more lithium-based positive electroactive materials selected from $LiNi_xMn_yCo_{1-x-y}O_2$ (where $0 \leq x \leq 1$ and $0 \leq y \leq 1$), $LiNi_xMn_{1-x}O_2$ (where $0 \leq x \leq 1$), $Li_{1+x}MO_2$ (where M is one of Mn, Ni, Co, and Al and $0 \leq x \leq 1$) (for example $LiCoO_2$ (LCO), $LiNiO_2$, $LiMnO_2$, $LiNi_{0.5}Mn_{0.5}O_2$, NMC111, NMC523, NMC622, NMC 721, NMC811, NCA). Spinel cathodes comprise one or more lithium-based positive electroactive materials selected from $LiMn_2O_4$ and $LiNi_{0.5}Mn_{1.5}O_4$. Olivine type cathodes comprise one or more lithium-based positive electroactive materials such as $LiV_2(PO_4)_3$, $LiFePO_4$, $LiCoPO_4$, and $LiMnPO_4$. Tavorite type cathodes comprise, for example, $LiVPO_4F$. Borate type cathodes comprise, for example, one or more of $LiFeBO_3$, $LiCoBO_3$, and $LiMnBO_3$. Silicate type cathodes comprise, for example, $Li_2FeSiO_4$, $Li_2MnSiO_4$, and $LiMnSiO_4F$. In still further variations, the positive electrode 24 may comprise one or more other positive electroactive materials, such as one or more of dilithium (2,5-dilithiooxy)terephthalate and polyimide. In various aspects, the positive electroactive material may be optionally coated (for example by $LiNbO_3$ and/or $Al_2O_3$) and/or may be doped (for example by one or more of magnesium (Mg), aluminum (Al), and manganese (Mn)).

The positive electrode active materials may be powder compositions. The positive electrode active materials may be intermingled with an optional electrically conductive material (e.g., electrically conductive particles) and a polymeric binder. The binder may both hold together the positive electrode electroactive material and provide ionic conductivity to the positive electrode 24. The polymeric binder may include polyvinylidene fluoride (PVDF), poly(vinylidene chloride) (PVC), poly((dichloro-1,4-phenylene)ethylene), carboxymethoxyl cellulose (CMC), nitrile butadiene rubber (NBR), fluorinated urethanes, fluorinated epoxies, fluorinated acrylics, copolymers of halogenated hydrocarbon polymers, epoxides, ethylene propylene diamine termonomer rubber (EPDM), hexafluoropropylene (HFP), ethylene acrylic acid copolymer (EAA), ethylene vinyl acetate copolymer (EVA), EAA/EVA copolymers, PVDF/HFP copolymers, polyvinylidene fluoride (PVDF), lithium polyacrylate (LiPAA), sodium polyacrylate (NaPAA), sodium alginate, lithium alginate, or combinations thereof.

Electrically conductive materials may include graphite, other carbon-based materials, conductive metals, or conductive polymer particles. Carbon-based materials may include, by way of non-limiting example, particles of KETCHEN™ black, DENKA™ black, acetylene black, carbon black, carbon nanotubes, and the like. Conductive metal particles may include nickel, gold, silver, copper, aluminum, and the like. Examples of a conductive polymer include polyaniline, polythiophene, polyacetylene, polypyrrole, and the like. In certain aspects, mixtures of electrically conductive materials may be used.

A positive electrode may comprise the positive electrode active material present at greater than about 60 wt. % of the overall weight of the electrode, optionally greater than or equal to about 65 wt. %, optionally greater than or equal to about 70 wt. %, optionally greater than or equal to about 75 wt. %, optionally greater than or equal to about 80 wt. %, optionally greater than or equal to about 85 wt. %, optionally greater than or equal to about 90 wt. %, and in certain variations, optionally greater than or equal to about 95% of the overall weight of the electrode.

The binder may be present in the positive electrode 24 at greater than or equal to about 1 wt. % to less than or equal to about 20 wt. %, optionally greater than or equal to about 1 wt. % to less than or equal to about 15 wt. %, optionally greater than or equal to about 1 wt. % to less than or equal to about 10 wt. %, optionally greater than or equal to about 1 wt. % to less than or equal to about 5 wt. %, or optionally greater than or equal to about 1 wt. % to less than or equal to about 3 wt. % of the total weight of the electrode.

In certain variations, the positive electrode 24 includes the electrically-conductive material at less than or equal to about 20 wt. %, optionally less than or equal to about 10 wt. %, optionally less than or equal to about 5 wt. %, optionally less than or equal to about 3 wt. %, optionally greater than or equal to about 1 wt. % to less than or equal to about 20 wt. % of the total weight of the positive electrode, optionally greater than or equal to about 1 wt. % to less than or equal to about 10 wt. % of the total weight of the positive electrode, or optionally greater than or equal to about 0.5 wt. % to less than or equal to about 8 wt. % of the total weight of the positive electrode. While the electrically conductive materials may be described as powders, these materials can lose their powder-like character following incorporation into the electrode, where the associated particles of the supplemental electrically conductive materials become a component of the resulting electrode structure.

Figure 3A:
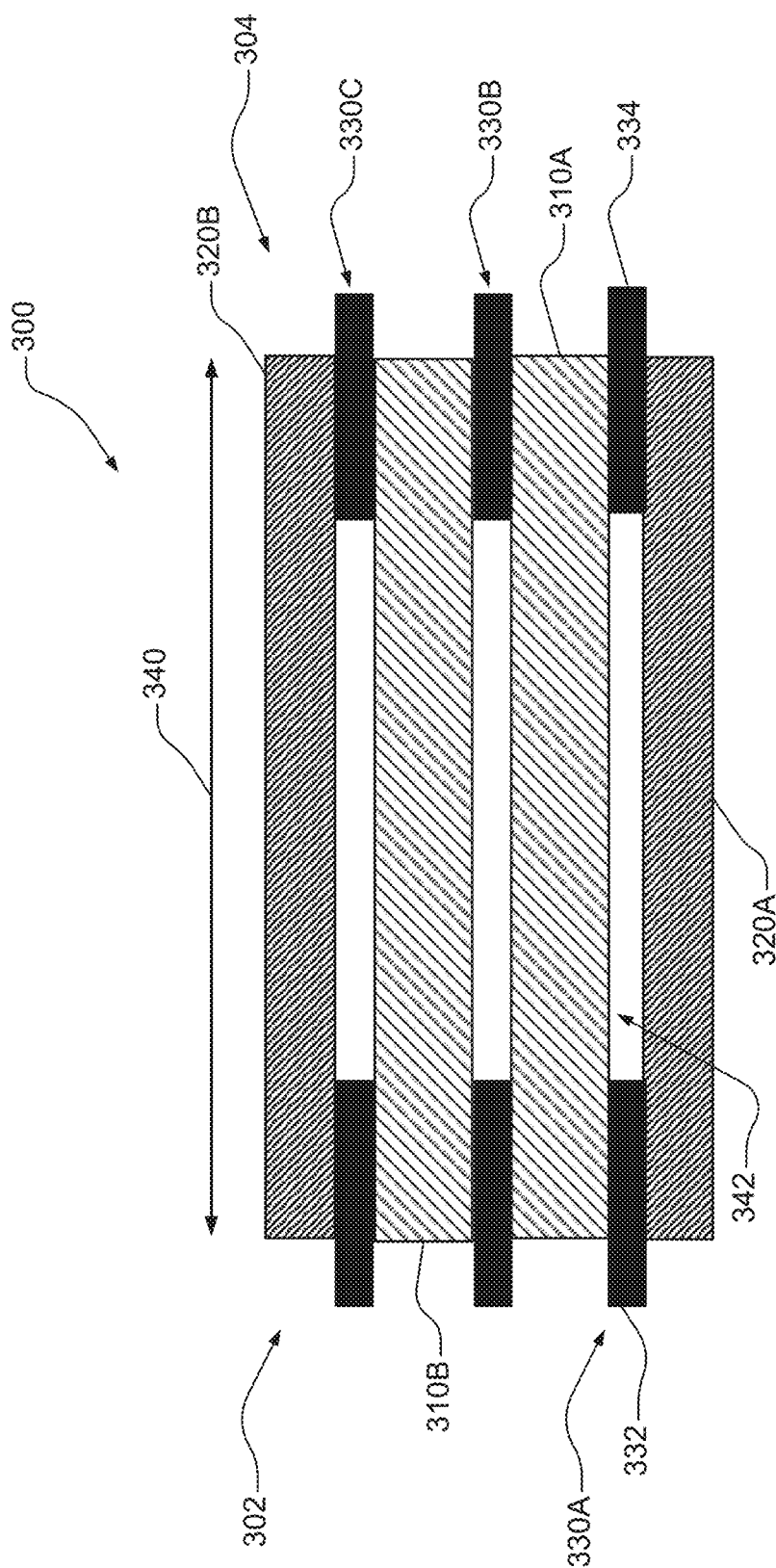
FIG. 3A is a cross-sectional schematic illustration of an example temperature control element in accordance with various aspects of the present disclosure.

As discussed above, the current technology provides systems and methods for regulating the operating temperature of electrochemical cells or batteries, and battery packs including one or more electrically connected (e.g., in series or parallel) electrochemical cells or batteries. FIG. 3A illustrates an example temperature control or regulating element 300 capable of active heating and passive cooling. The temperature control element 300 comprises one or more first elements or layers or foils 310A, 310B comprising anisotropic thermal and/or electrically conducting materials disposed between two or more structural elements or layers 320A, 320B. For example, as illustrated, the temperature control element 300 includes two first layers 310A, 310B disposed (i.e., sandwiched) between a first structural layer 320A and a second structural layer 320B. In certain instances, although not illustrated, the temperature control element 300 may further include additional layers, such as a third structural layer 320C disposed between the lower first layer 310A and the upper first layer 310B.

Anisotropic refers to materials having a physical property that has different values when measured in different directions. For example, graphite sheets may be produced to have a much higher thermal conductivity in the x-y plane than in the z-plane, which causes heat to spread laterally unlike most metals where heat spreads in all directions equally. As such, anisotropic thermal and/or electrical conducting materials may be good thermal conductors and when an electrical field is applied in one direction, such a material can become a heater that remains non-electrically activated based on the directional placement of the material. The anisotropic thermal and/or electrical conducting materials may include graphite, graphene, carbon nanotubes (CNT), crystal materials (such as boron arsenide), one or more cohesive powders (cohesive powders are particulates that form aggregates or agglomerates due to attractive forces between particles, which tend to increase with smaller particle sizes, for example, particles having an average particle size below 100

μm), and/or other conductive inert carbons. Examples of suitable cohesive powders include graphite flakes and/or metal powder that are compressed together so as to act as an integral, uninterrupted thermal and/or electrical conductor.

The skilled artisan will appreciate that such anisotropic thermal and/or electrical conducting materials may be treated with one or more known techniques, for example, passivated so as to, for example, prevent corrosion, changes in thermal/electrical conductivity, and the like; coated with known materials (such as silicon, polyethylene terephthalate (PET), etc., and/or known oxidization layers (i.e., protectant layers)) so as to improve, for example, physical characteristics, mechanical strength, and the like and reduce material breakdown overtime resulting from, for example, thermal cycling; and/or allowed so as to enhance, for example, various desirable characteristics. Further, the skilled artisan will appreciate that such anisotropic thermal and/or electrical conducting materials are not commonly used for individually/regionally controlled heating elements.

The one or more first layers 310A, 310B, including the anisotropic thermal and/or electrical conducting materials, may each have a thickness greater than or equal to about 1 μm to less than or equal to about 10,000 μm. The thickness of the one or more first layers 310A, 310B, including the anisotropic thermal and/or electrical conducting materials may be selected so as to provide, for example, desired thermal and electrical conductivity and/or mechanical strength, as well as to balance preferred weight, size, and costs. In certain aspects, the one or more first layers 310A, 310B may have the same thickness of certain cell plates (not shown) so as to minimize the impact on the thickness of the battery (not shown).

The skilled artisan will appreciate that, in various aspects, the one or more first layers 310A, 310B, including the anisotropic thermally and/or electrically conducting materials, may also include one or more known additives, such as fillers and/or binders. For example, the one or more first layers 310A, 310B may include one or more thermal conductive material additives that tune resistance of the one or more first layers 310A, 310B so as to improve, for example, the generation of self-heat. Such thermally conductive material additives may also improve the manufacturability of the one or more first layers 310A, 310B. The one or more thermal conductive material additives may be polymers and/or polymers combined with metal compounds as composites, for example only, as provided in the following table:

TABLE 1

Example Thermally Conductive Material Additives

| Company | Polymer | Brand | Thermal Conductivity w(m · K)$^{-1}$ |
|---|---|---|---|
| COOLPOLY ® | LCP | D5506 | 10 |
|  | PPS | E5101 | 20 |
|  | PPS | E5108 | 10 |
|  | PC | E4505 | 4 |
| Laticonther | PPS | Lati80/50 | 10 |
|  | PA6 | Lati62GR/70 | 15 |
| DSM | PA46 | Tanyl-TC153 | 8 |
|  | PA46 | Stanyl-TC551 | 14 |
|  | PA46 | Stanyl-RC154 | — |
| Albis | PPSGF46 | TedurR9519 | — |
|  | PP66 | AlcomTCE10 | 10 |
|  | PA6 | AlcomTCE10 | 10 |
|  | PBT | AlcomTCE10 | 10 |
| Ticona | PPS | FortronPPS | — |
|  | LCP | ZeniteLCP | — |

TABLE 1-continued

Example Thermally Conductive Material Additives

| Company | Polymer | Brand | Thermal Conductivity w(m · K)$^{-1}$ |
|---|---|---|---|
| Sabic | PPS | OTF2A | 2.2 |
|  | PPS | OTF2B | 1.05 |

Such polymeric materials may be mixed with one or more metal compounds, such as, for example only, BeO (219 w(m·K)$^{-1}$), MgO (36 w(m·K)$^{-1}$), Al$_2$O$_3$ (30 w(m·K)$^{-1}$), CaO (15 w(m·K)$^{-1}$), NiO (12 w(m·K)$^{-1}$), AlN (320 w(m·K)$^{-1}$), and/or SiN (270 w(m·K)$^{-1}$.

The structural layers 320A, 320B are selected based on the performance requirements for the particular device. For example, if the temperature control elements 300 are to be intimately pressed against battery cells, for example, as shown in FIG. 3A, the type and application of battery cells and pack (e.g., automotive, military, commercial, low-voltage, high-voltage) and the battery's sensitivity to, for example, electromagnetic interference (EMI) and noise introduction, as well as likelihood of crash, crush, deformation, irradiation, etc., will guide the selection of the appropriate structural layers 320A, 320B. In various instances, the structural layers 320A, 320B may provide the temperature control element 300 with sufficient mechanical strength, bendability, and electrical isolation. The structural layers 320A, 320B may minimize or eliminate possible mechanical damage to or of the one or more first layers 310A, 310B.

Figure 3B:
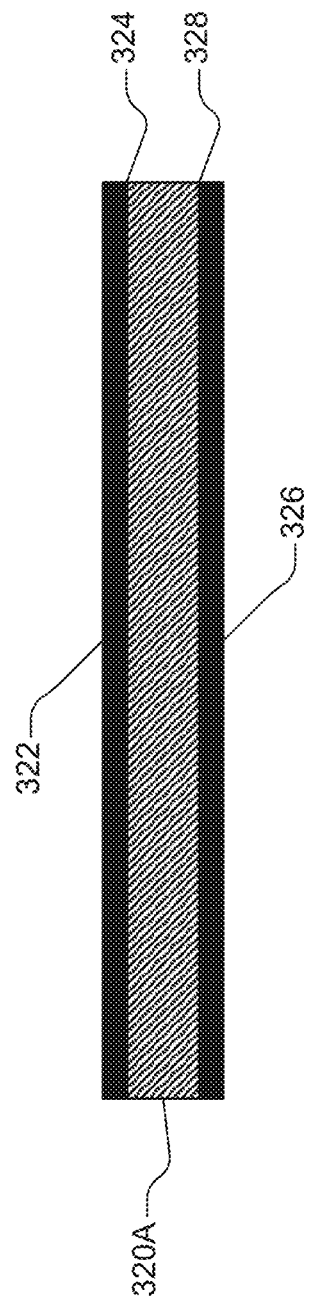
FIG. 3B is a cross-sectional schematic illustration of an example structural layer having one or more supporting adhesive coatings.

The structural layers 320A, 320B may be formed of a material that includes mica, asbestos, marble, porcelain, glass, shellac, resin, rubber, cotton yarn, paper, linen, rayon, and/or plastic. In various aspects, the structural layers 320A, 320B may further include, a single or double-sided adhesive(s) that also has sufficient mechanical strength, bendability, and electrical isolation. The single or double-sided adhesive(s) may be sprayed, flowed, deposited, etc. onto one or more exposed surfaces of the structural layers 320A, 320B. For example, as illustrated in FIG. 3B, one or more first adhesives may be disposed as a first coating 322 on a first surface 324 of the first structural layer 320A; and one or more second adhesives may be disposed as a second coating 326 on a second surface 328 of the first structural layer 320A. The single or double-sided adhesive(s) may comprise, for example, polyethylene terephthalate (PET), polypropylene (PP), polyethylene (PE), and/or polytetrafluoroethylene (PTFE).

The temperature control element 300 also includes one or more tab layers 330A, 330B, 330C that make both electrical (ohmic) and thermal connection with the one or more first layers 310A, 310B. The tab layers 330A, 330B, 330C include a relatively high mechanical strength, electrically conductive material, such as copper, aluminum, nickel, nickel coated copper, stainless steel, and/or aluminum alloys. The tab layers 330A, 330B, 330C may be disposed between one or more of the first layers 310A, 310B and/or between the one or more first layers 310A, 310B and the one or more structural layers 320A, 320B. Notably, the tabs 330A, 330B, 330C may or may not be coextensive along a length 340 of the first layers 310A, 310B, but rather, as shown in FIG. 3A may only be disposed on terminal ends 302, 304 of the first layers 310A, 310B, such that a gap 342 is defined in the central region between each respective tab 330A, 330B, 330C on a single plane. For example, as illustrated in FIG. 3A, a first tab layer 330A may be disposed between the first structural layer 320A and the first layer 310A; a second tab layer 330B may be disposed between the first layer 310A and the first layer 310B; a third tab layer 330C may be disposed between the first layer 310B and the second structural layer 320B. As discussed above, the tab layers 330A, 330B, 330C may extend the length of and be substantially coextensive with the surface of one or more first layers 310A, 310B and/or the one or more structural layers 320A, 320B. In certain other instances, like that shown in FIG. 3A, each tab layer 330A, 330B, 330C may include a first piece or subpart 332 and a second piece or subpart 334. As illustrated, the first piece 332 of each tab layer 330A, 330B, 330C may be disposed on, for example extend from, a first side 302 of the temperature control element 330, and the second piece 334 of each tab layer 330A, 330B, 330C may be disposed on, for example, extend from, a second side 304 of the temperature control element 330.

Figure 4:
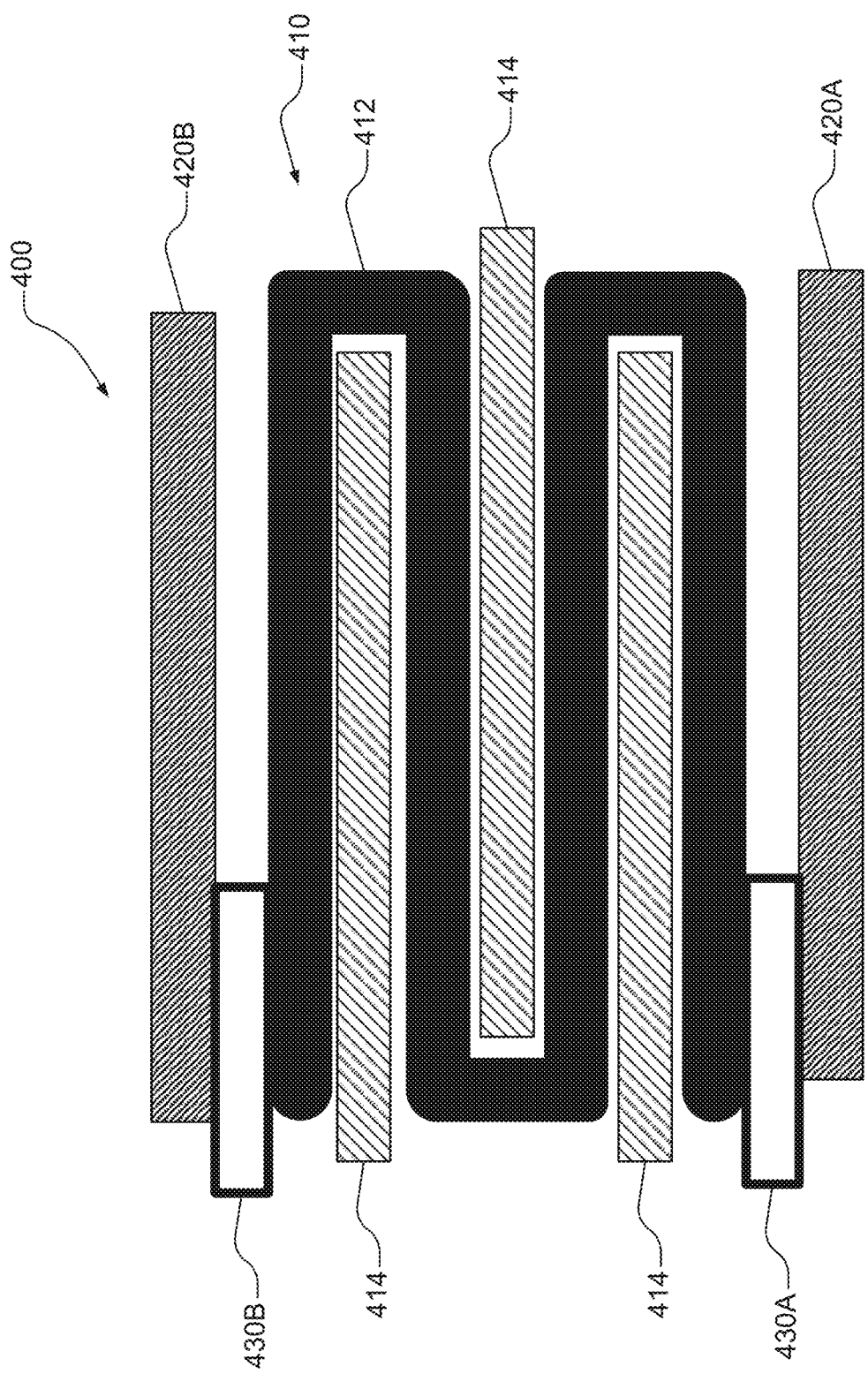
FIG. 4 is a cross-sectional schematic illustration of another example temperature control element in accordance with various aspects of the present disclosure.

FIG. 4 illustrates another example temperature control element 400 capable of active heating and passive cooling of an electrochemical cell. The temperature control element 400 comprises a first element 410 disposed between two or more structural elements or layers 420A, 420B. For example, as illustrated, the first element 410 may be disposed between a first structural layer 420A and a second structural layer 420B.

The structural layers 420A, 420B provide the temperature control element 400 with sufficient mechanical strength, bendability, and electrical isolation. For example, the structural layers 420A, 420B may include a material, such as mica, asbestos, marble, porcelain, glass, shellac, resin, rubber, cotton yarn, paper, linen, rayon, and/or plastic. In certain aspects, as is appreciated by the skilled artisan, the structural layers 420A, 420B may further include a single or double-sided adhesive that also has sufficient mechanical strength, bendability, and electrical isolation. The single or double-sided adhesive comprises, for example, polyethylene terephthalate (PET), polypropylene (PP), polyethylene (PE), and/or polytetrafluoroethylene (PTFE). The structural layers 420A, 420B provide mechanical strength to the temperature control element 400 and minimize or eliminate possible mechanical damage to or of the first element 410.

The first element 410 is formed of a film or foil 412 that comprises a plurality of folds (e.g., where the film or foil 412 experiences a change in direction of approximately 180°) that wrap around one or more insulating layers 414. In other words, the one or more insulating layers 414 are disposed between the folds of the film 412. The film 412 comprises one or more anisotropic thermal and/or electrically conducting materials, and may have a thickness greater than or equal to about 1 µm to less than or equal to about 10,000 µm. The anisotropic thermal and/or electrically conducting materials may include graphite, graphene, carbon nanotubes (CNT), crystal materials (such as boron arsenide), cohesive powder, and/or other conductive inert carbons. The one or more insulating layers 414 may include known insulating materials.

The temperature control element 400 also includes one or more tabs 430A, 430B that make both electrical (ohmic) and thermal connection with the film 412. The tabs 430A, 430B include a relatively high strength, electrically conductive material like those described above in the context of tabs 330B, 330A, 330C in FIG. 3A, such as copper, aluminum, nickel, nickel coated copper, stainless steel, and/or aluminum alloys. The tabs 430A, 430B may be disposed between the first element 410 and the one or more structural layers 420A, 420B. For example, as illustrated in FIG. 4, a first tab 430A may be disposed between the first element 410 and a first structural layer 420A and a second tab 430B may be disposed between the first element 410 and a second structural layer 420B.

Figure 5:
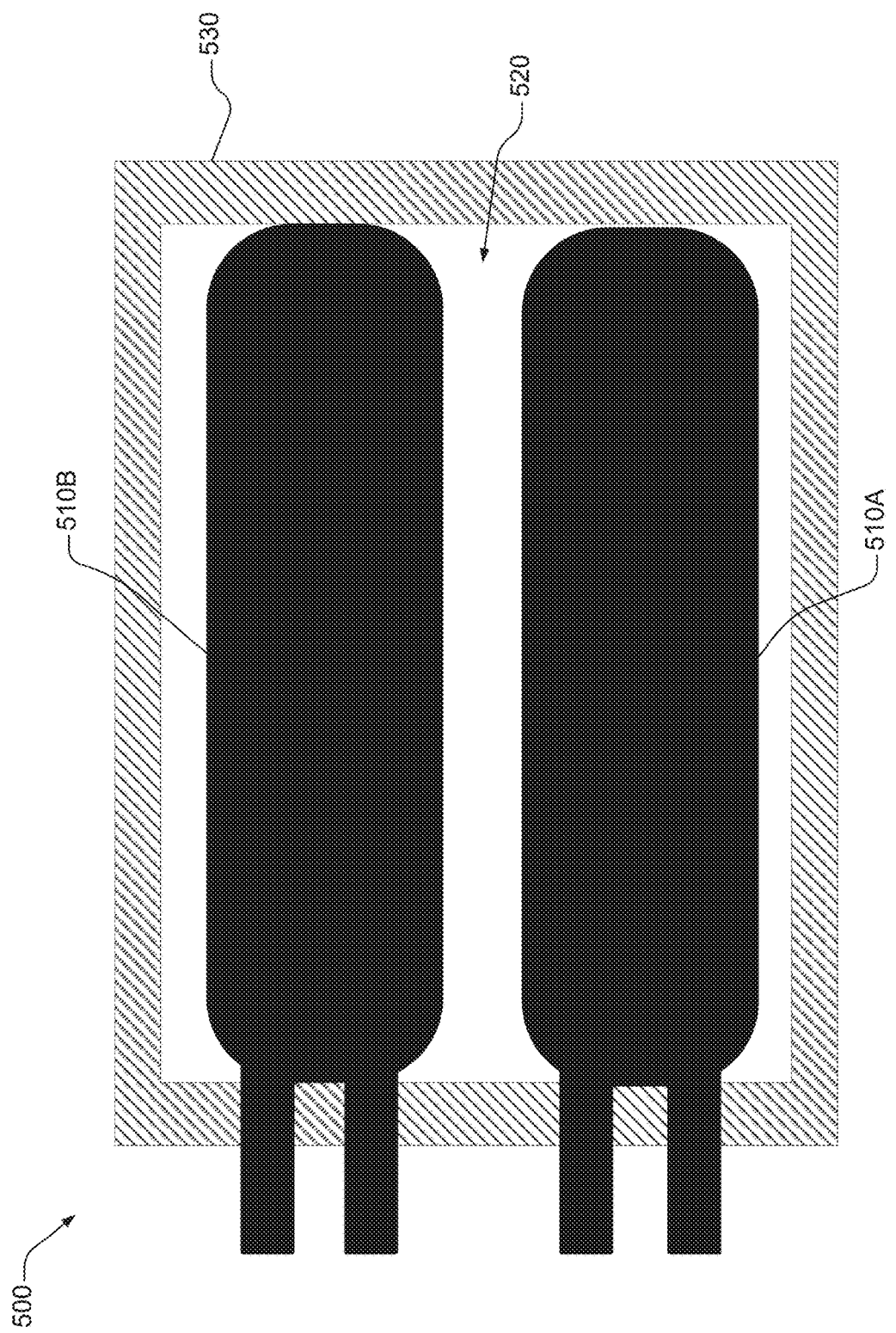
FIG. 5 is a top-down schematic illustration of another example temperature control element having different thermal zones in accordance with various aspects of the present disclosure.

FIG. 5 illustrates yet another example temperature control element 500 that is capable of active heating and passive cooling when disposed in heat transfer relationship with an electrochemical cell. The temperature control element 500 includes two or more independently controlled temperature zones or regions 510A, 510B. For example, as illustrated, the temperature control element 500 may have a first temperature control element 510A and a second temperature control element 510B. Each of the temperature zones 510A, 510B, similar to the temperature control element 300 illustrated in FIG. 3A and/or the temperature control element 400 illustrated in FIG. 4, includes one or more first element or layer comprising anisotropic thermal and/or electrical conducting materials disposed between two or more structural layers and one or more tables. Each temperature zone 510A, 510B may also include one or more insulating layers, for example similar to insulating layers 414 illustrated in FIG. 4.

Although not illustrated, the skilled artisan will appreciate that each of the temperature zones 510A, 510B may have a configuration similar to the temperature control element 300 illustrated in FIG. 3A and/or the temperature control element 400 illustrated in FIG. 4. However, distinct from the configurations of FIGS. 3A and 4, the temperature control element 500 illustrated in FIG. 5, includes a plurality of temperature zones 510A, 510B that may be independently controlled from one another. As illustrated, the temperature zones 510A, 510B of the plurality may be separated using an electrically insulating material 520 and enclosed by, or disposed between, one or more structural elements or layers 530.

The electrically insulating material 520 may include known insulating materials, as would be known to those of skill in the art. The structural layers 530 provide the temperature control element 500 with sufficient mechanical strength, bendability, and electrical isolation. For example, the structural elements 520 may include mica, asbestos, marble, porcelain, glass, shellac, resin, rubber, cotton yarn, paper, linen, rayon, and/or plastic. In certain aspects, the structural layers 520 may further include a single or double-sided adhesive that also has sufficient mechanical strength, bendability, and electrical isolation. The single or double-sided adhesive comprises, for example, polyethylene terephthalate (PET), polypropylene (PP), polyethylene (PE), and/or polytetrafluoroethylene (PTFE).

Figure 6:
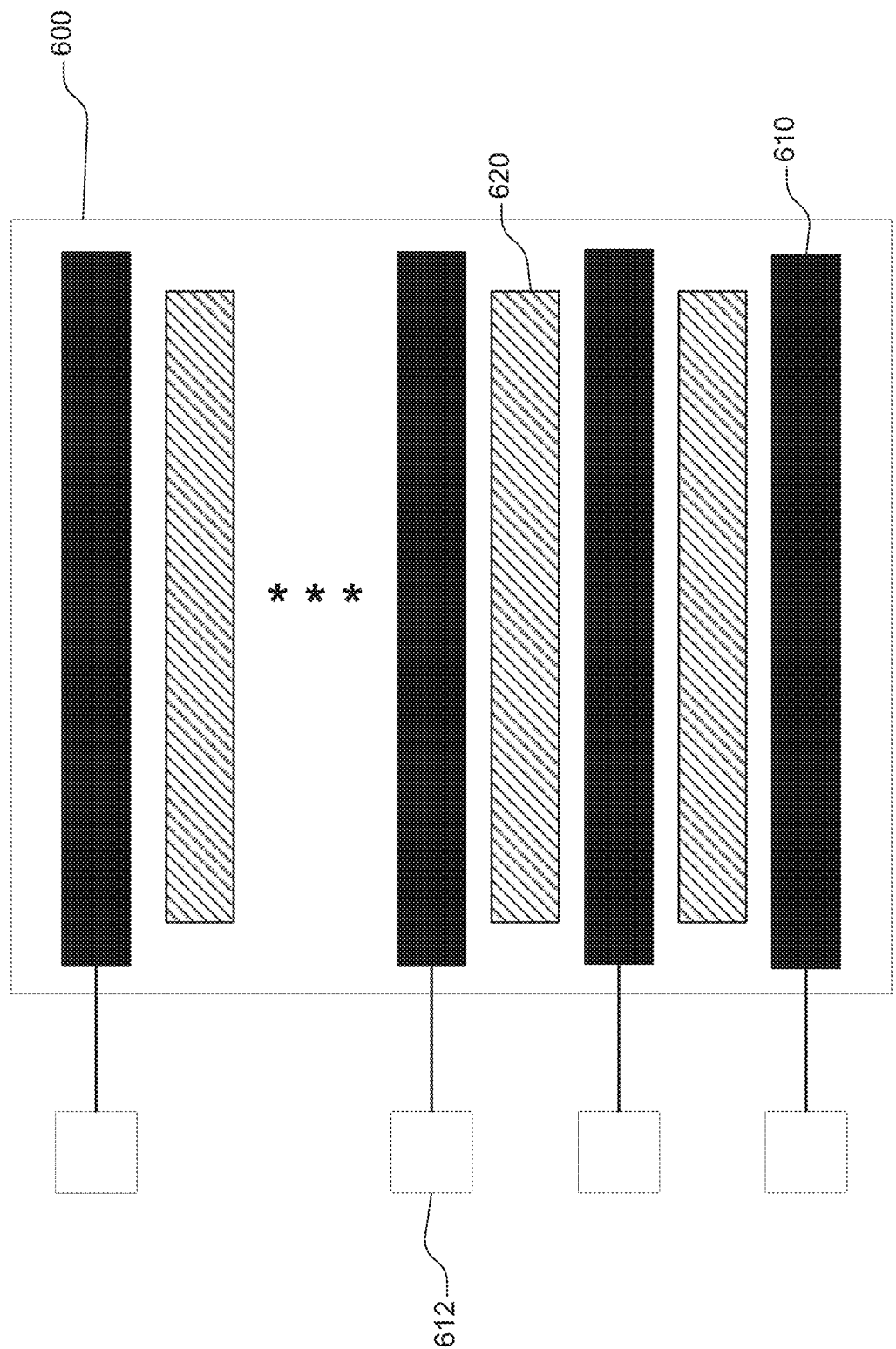
FIG. 6 is a cross-sectional schematic illustration of an example battery pack including a plurality of battery cells and temperature control elements in accordance with various aspects of the present disclosure.

Temperature control elements including an anisotropic material or element, such as graphite, for example in the form of a foil, as a heating material or element (e.g., an active heater) and a cooling material or element (e.g., passive cooling), such as, for example only, temperature control element 300 illustrated in FIG. 3A and/or temperature control element 400 illustrated in FIG. 4 and/or temperature control element 500 illustrated in FIG. 5, can be integrated into a battery module and/or battery pack (such as illustrated in FIG. 2) in various fashions. For example, in certain instances, as illustrated in FIG. 6, individual temperature control elements 610 can be disposed between one or more cells 620 within a battery pack 600. Each cell of the one or more cells 620 may be a battery 20 such as described in the instance of FIG. 1. Each temperature control element 610 of the plurality may be a temperature control element 300 as illustrated in FIG. 3A and/or temperature control element 400 as illustrated in FIG. 4 and/or temperature control element 500 as illustrated in FIG. 5. The asterisks (*) shown in FIG. 6 are meant to illustrate that battery pack 600 may include any number of alternating cells 620 and temperature control elements 610.

As illustrated, each of temperature control elements 610 may be in electrical communication with, and independently controlled using, for example, a field-effect transistor and/or pulse width modulation and/or mechanical connector 612. In this manner, the temperature control elements 610 may be used to apply different temperature controls to different regions of the battery pack 600 providing flexible zone control, for example to combat spread from a runaway cell and to target particular areas within the battery pack.

Figure 7:
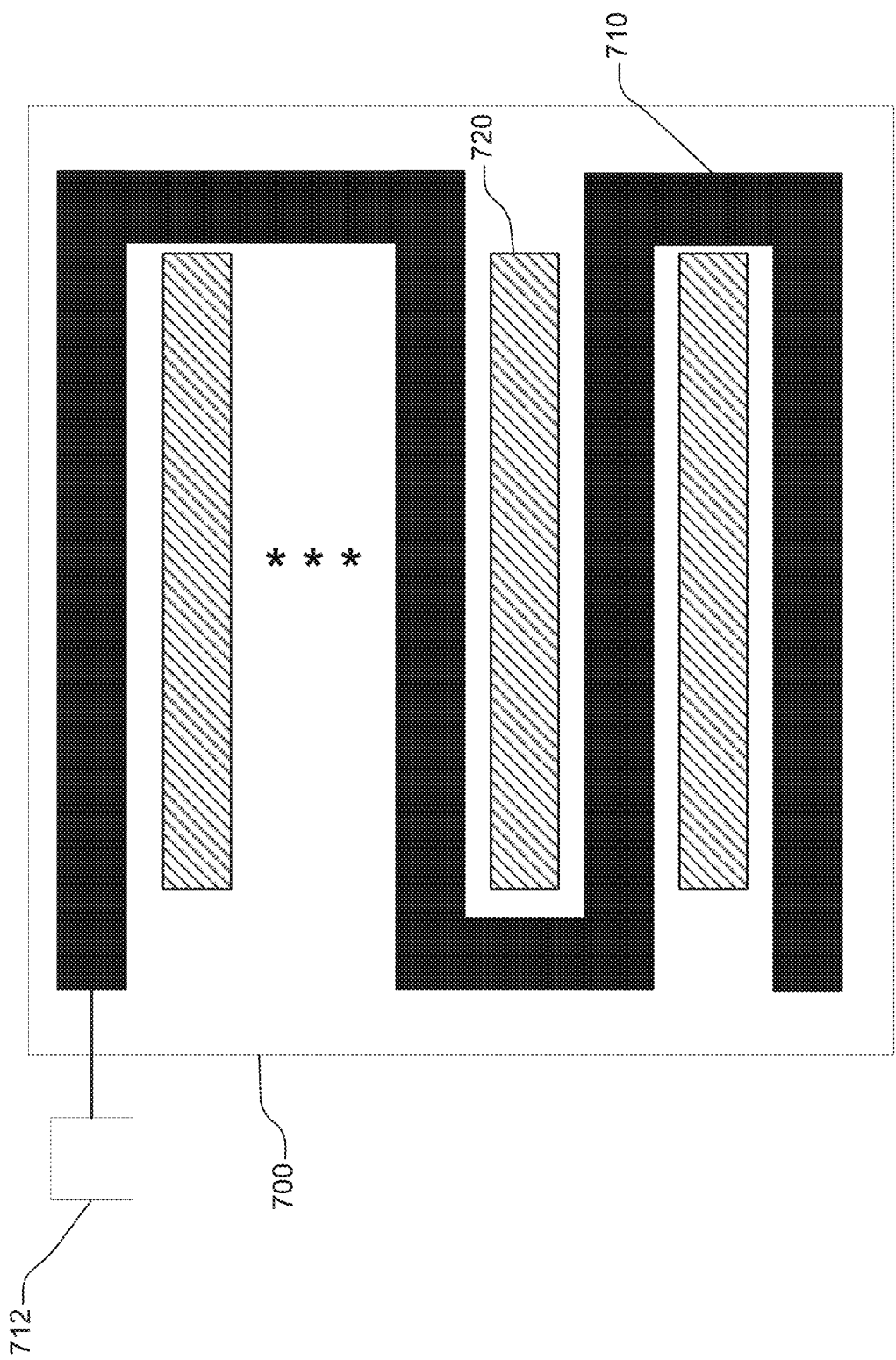
FIG. 7 is a cross-sectional schematic illustration of another example battery pack including a plurality of battery cells and temperature control elements in accordance with various aspects of the present disclosure.

The use of temperature control elements 610 including anisotropic thermal and/or electrical conducting materials. For example, graphite may be used, where the resistivity of the graphite can create an active, even-heating solution to warm the cells 620 when current is passed through the graphite. Additionally, the same feature can be used to passively cool the cells 620 by pulling heat away using the anisotropic nature of the graphite (e.g., anisotropic thermal conductivities by axis). In various instances, the joining of the anisotropic element and the insulating structural element may minimize or prevent thermal spreading prior to and after heat reaches the insulation so as to prevent thermal propagation. Further still, the non-combustibility of the anisotropic thermal and/or electrical conducting materials provide protection in the instance of cell runaway. For example, the anisotropic material (e.g., graphite) preferentially spreads the heat in the x-y plane, and as such, slows the z-plane heat transfer to adjacent cells so as to reduce peak temperature, thus mitigating and/or preventing the igniting an adjacent cell. FIG. 6 illustrates one instance including a singular element in which heat/temperature would be essentially equal at all points in the solution (assuming the materials, thicknesses, etc. are homogenous). FIG. 7, as discussed in further detail below, enables preferential heating by enabling discrete control of different regions of the battery. For instance, the inner (central) cells heat and cool differently than the outer (distal) cells.

As illustrated in FIG. 7, a temperature control element 710 can be wrapped around one or more cells 720 of a battery pack 700. In other words, the one or more cells 720 are disposed between the folds of the temperature control element 710. Each cell of the one or more cells 720 may be a battery 20 such as described in the context of FIG. 1. Each temperature control element 610 of the plurality may be a temperature control element 300 illustrated in FIG. 3A and/or temperature control element 400 illustrated in FIG. 4 and/or temperature control element 500 as illustrated in FIG. 5. The asterisks (*) as shown in FIG. 7 are meant to illustrate that battery pack 700 may include any number of alternating cells 720 and temperature control elements 710. As illustrated, the temperature control element 710 may be in electrical communication with, and controlled using, for example, a field-effect transistor and/or pulse width modulation and/or mechanical connector 712.

Embodiments of the present technology are further illustrated through the following non-limiting example.

Example

Figure 8A:
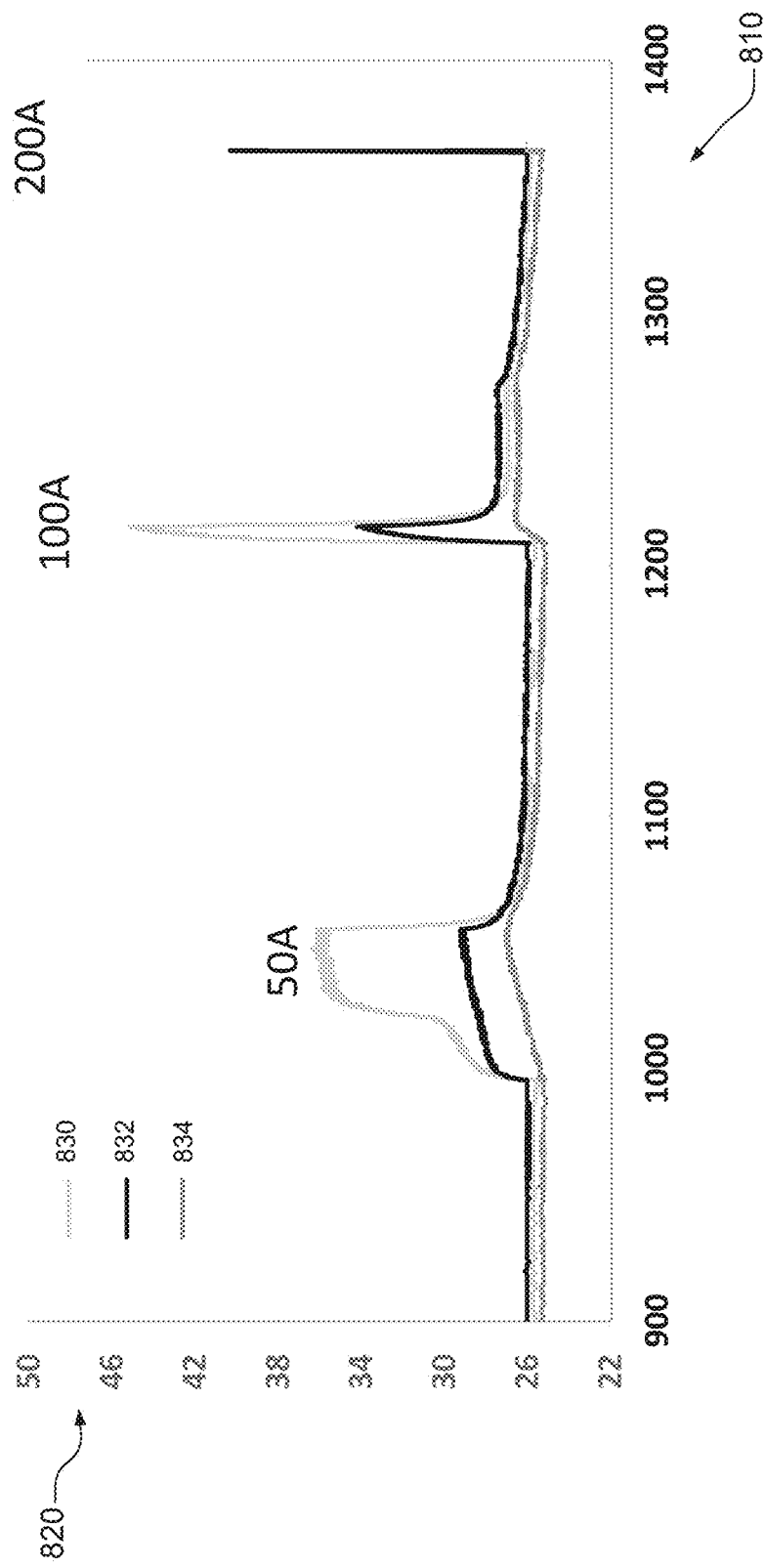
FIG. 8A is a cell temperature (° C.) profile for a conventional electrochemical cell over a sixty-minute period.
Figure 8B:
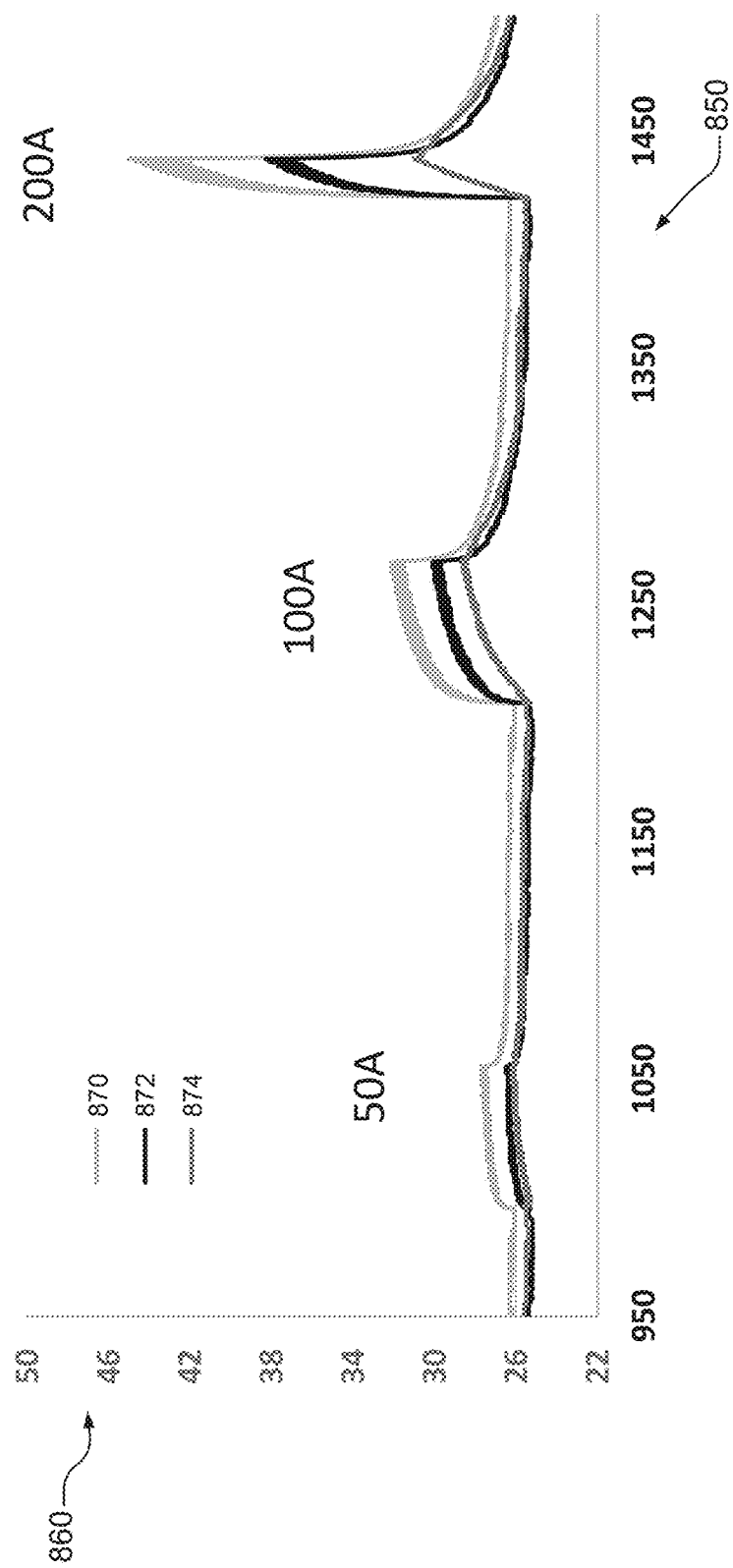
FIG. 8B is a cell temperature (° C.) profile for an electrochemical cell including temperature control elements in accordance with various aspects of the present disclosure.

FIGS. 8A-8B provide cell temperature (° C.) profiles for example cells over a sixty-minute period.

FIG. 8A illustrates the temperature profile for a conventional electrochemical cell (e.g., bare cell), where 830 represents the positive battery terminal, 832 represents the negative battery terminal, and 834 represents the cell center. In FIG. 8A, the x-axis 810 represents the test time in minutes, and the y-axis 820 represents the cell temperature (° C.).

FIG. 8B illustrates the temperature profile for an electrochemical cell including a temperature control element in accordance with various aspects of the present disclosure, where 870 represents the positive battery terminal, 872 represents the negative battery terminal, and 874 represents the cell center. In FIG. 8B, the x-axis 850 represents the test time in minutes, and the y-axis 860 represents the cell temperature (° C.).

As illustrated in FIG. 8A, the bare cell lasted for less than one minute and the intra-cell temperatures show that the tab thermocouple is much hotter than the comparative cell prepared in accordance with various aspects of the present disclosure, as illustrated in FIG. 8B. More specifically, as illustrated in FIG. 8B, the electrochemical cell, including the temperature control element in accordance with various aspects of the present disclosure, ran for about 20 minutes prior to exceeding the 20° C. temperature delta. Moreover, the intra-cell temperatures for the positive terminal 870, negative terminal 872, and cell center 874 are much tighter. The tighter temperatures mean more even intra-cell and inter-cell wear within the comparative cell prepared in accordance with various aspects of the present disclosure, providing as improved performance and, in particular, improved reliability and safety.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A temperature control element comprising:
    two or more structural elements;
    one or more anisotropic elements disposed between the two or more structural elements, the one or more anisotropic elements each comprising one or more anisotropic materials selected from the group consisting of: graphite, graphene, carbon nanotubes (CNT), crystal materials, cohesive powder, and combinations thereof; and
    one or more tabs in electrical communication with at least one of the one or more anisotropic elements, the one or more tabs each comprising one or more of copper, aluminum, nickel, nickel coated copper, stainless steel, and aluminum alloys,
    wherein the temperature control element is configured to be in a heat transfer relationship with an electrochemical cell so as to heat and/or cool the electrochemical cell.

2. The temperature control element of claim 1, wherein the one or more tabs define one or more tab layers,
    wherein a first tab layer is disposed between the one or more anisotropic elements and a first structural element of the two or more structural elements and a second tab layer is disposed between the one or more anisotropic elements and a second structural element of the two or more structural elements, and wherein each tab layer of the one or more tab layers comprises a first part that is disposed at a first terminal end and a second part that is disposed at a second terminal end separated from the first terminal end such that a gap is defined in a central region between the first part and the second part of each tab layer of the one or more tab layers.

3. The temperature control element of claim 1, wherein the one or more anisotropic elements and the one or more tabs define a heating element.

4. The temperature control element of claim 1, wherein the two or more structural elements each comprise one or more of mica, asbestos, marble, porcelain, glass, shellac, resin, rubber, cotton yarn, paper, linen, rayon, and plastic.

5. The temperature control element of claim 4, wherein at least one of the two or more structural elements further comprises one or more adhesive materials selected from the group consisting of: polyethylene terephthalate (PET), polypropylene (PP), polyethylene (PE), polytetrafluoroethylene (PTFE), and combinations thereof.

6. The temperature control element of claim 1, wherein the two or more structural elements are first structural elements and the temperature control element further comprises one or more second structural elements disposed between adjacent anisotropic elements.

7. The temperature control element of claim 1, wherein the one or more anisotropic elements define one or more foils, each foil having a thickness greater than or equal to about 1 µm to less than or equal to about 10,000 µm.

8. The temperature control element of claim 7, wherein the temperature control element further comprises one or more insulating materials, the one or more foils each have a plurality of folds, and the one or more insulating materials are disposed between the folds of the one or more foils defining the one or more anisotropic elements.

9. The temperature control element of claim 1, wherein the one or more anisotropic elements comprise a first grouping of anisotropic elements comprising one or more first anisotropic materials and a second grouping of anisotropic elements comprising one or more second anisotropic materials.

10. The temperature control element of claim 9, wherein the two or more structural elements are one or more first structural elements and the temperature control element further comprises one or more second structural elements disposed between the first grouping of anisotropic elements and the second grouping of anisotropic elements.

11. A battery pack having a temperature regulating system comprising one or more temperature control elements, wherein
the battery pack comprises:
a plurality of electrochemical cells arranged in a stack, and
each temperature control element of the one or more temperature control elements comprises:
two or more structural elements;
one or more anisotropic elements disposed between the two or more structural elements, the one or more anisotropic elements each comprising one or more anisotropic materials selected from the group consisting of: graphite, graphene, carbon nanotubes (CNT), crystal materials, cohesive powder, and combinations thereof; and
one or more tabs in electrical communication with at least one of the one or more anisotropic elements, the one or more tabs each comprising one or more of copper, aluminum, nickel, nickel coated copper, stainless steel, and aluminum alloys,
wherein the temperature control elements are at least one of: (i) disposed between the electrochemical cells of the stack; (ii) disposed around the electrochemical cells of the stack; or (iii) both (i) and (ii).

12. The battery pack of claim 11, wherein the one or more anisotropic elements and the one or more tabs of each temperature control element defines a heating element.

13. The battery pack of claim 11, wherein the two or more structural elements of each temperature control element comprise one or more of mica, asbestos, marble, porcelain, glass, shellac, resin, rubber, cotton yarn, paper, linen, rayon, and plastic and one or more adhesive materials selected from the group consisting of: polyethylene terephthalate (PET), polypropylene (PP), polyethylene (PE), polytetrafluoroethylene (PTFE), and combinations thereof.

14. The battery pack of claim 11, wherein the one or more anisotropic elements of each temperature control element comprises a first grouping of anisotropic elements comprising one or more first anisotropic elements and a second grouping of anisotropic elements comprising one or more second anisotropic elements.

15. The battery pack of claim 11, wherein each temperature control element of the one or more temperature control elements is independent from other temperature control elements of the one or more temperature control elements.

16. The battery pack of claim 11, wherein the one or more temperature control elements defines one or more foils, the one or more foils each have a plurality of folds, and individual electrochemical cells of the stack are disposed between folds of the one or more foils defining the one or more temperature control elements.

17. The battery pack of claim 11, wherein the one or more temperature control elements define distinct layers and individual electrochemical cells of the stack are disposed between the distinct layers.

18. A temperature control element comprising:
two or more structural elements coated, wherein each structural element is coated with one or more adhesive layers;
one or more anisotropic elements disposed between the two or more structural elements, wherein the one or more anisotropic elements comprise a first grouping of anisotropic elements comprising one or more first anisotropic materials and a second grouping of anisotropic elements comprising one or more second anisotropic materials, wherein the one or more first anisotropic materials and the one or more second anisotropic materials are each selected from the group consisting of: graphite, graphene, carbon nanotubes (CNT), crystal materials, cohesive powder, and combinations thereof; and
one or more tabs in electrical communication with at least one of the one or more anisotropic elements, the one or more tabs each comprising one or more of copper, aluminum, nickel, nickel coated copper, stainless steel, and aluminum alloys,
wherein the temperature control element is configured to be in a heat transfer relationship with an electrochemical cell so as to heat and/or cool the electrochemical cell.

* * * * *